United States Patent Office 2,804,186
Patented Aug. 27, 1957

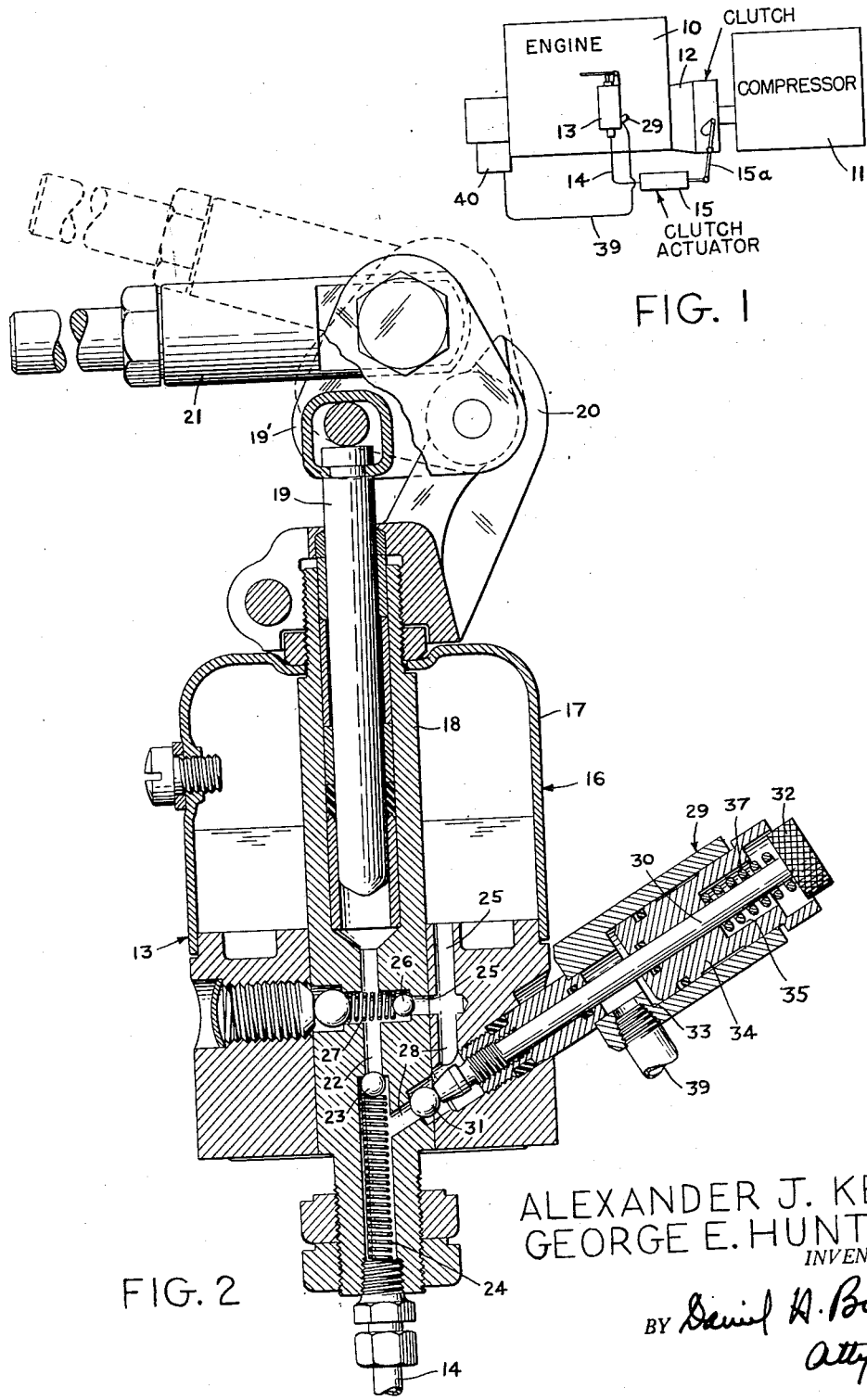

2,804,186

CLUTCH SAFETY MECHANISM

Alexander J. Keir, Springfield, and George E. Hunter, South Hadley Falls, Mass., assignors to Worthington Corporation, Harrison, N. J., a corporation of Delaware Application April 20, 1955, Serial No. 502,679

8 Claims. (Cl. 192—85)

The present invention relates to a clutch mechanism and more particularly to a safety device for preventing disengagement of the clutch mechanism.

In many types of machinery it is a common practice to use a clutch mechanism between the driving or prime mover and the machine to be driven to transmit the energy of the prime mover to the driven machine. For example, in a compressor set in which a compressor is driven by an internal combustion engine, it is common practice to provide a clutch between the compressor and engine to transmit the energy of the engine to the compressor. In such installations the clutch is sometimes released before the engine is stopped and the engine oil pressure is zero.

In accordance with the present invention, a safety device is provided for a clutch actuator means by which the clutch mechanism is engaged and disengaged to prevent release or disengagement of the clutch mechanism until the prime mover is stopped.

The invention will be better understood from the following description when considered in connection with the accompanying drawing forming a part thereof and in which:

Figure 1 is a diagrammatic view of a compressor engine set shown for the purposes of illustration, embodying the clutch mechanism safety device of the present invention, and Figure 2 is a sectional view of the clutch mechanism safety device of the present invention.

Referring to the drawings, the reference character 10 designates an internal combustion engine connected to a compressor 11 through a clutch 12 to transmit energy from the engine to the compressor. A hydraulic ram or pump 13 is provided on engine 10 and is connected by a fluid line 14 to a hydraulic clutch actuator 15. Actuator 15 is operatively connected to a linkage 15a connected to the clutch 12 to engage and disengage the clutch in response to the pressure of fluid in line 14.

Pump 13 comprises a housing 16 having a fluid reservoir 17 disposed in the upper portion thereof. A substantially vertical cylinder 18 is disposed in reservoir 17 and is provided with a plunger type piston 19 therein. The upper end of piston 19 is adapted to be pivotally connected to a linkage element 19'. Element 19' is pivotally connected to a support 20 fixed to housing 16 and is provided with a handle 21. Upward and downward movement of handle 21 moves linkage 19' about support 20 and piston 19 upwardly and downwardly in cylinder 18 through the linkage. The lower end of cylinder 18 communicates with fluid line 14 through a vertically extending fluid passage 22 having a ball check valve 23 therein. A compression spring 24 is positioned below ball 23 and normally maintains the ball in a seated or closed position. An L-shaped passage 25 is provided in communication with the lower portion of reservoir 17 and the upper portion of passage 22. A ball check valve 26 is positioned in passage 25 having a spring 27 positioned against the valve for normally maintaining ball check valve 26 in a seated position to close off communication of reservoir 17 with passage 22 when pump 13 is not in operation, as hereinafter described. A fluid by-pass passage 28 is disposed in the lower portion of the housing and communicates at the lower end thereof with passage 22 and at the upper end thereof with passage 25.

The clutch safety device 29 of the present invention comprises a housing threaded into the lower portion of the housing 16 adjacent the lower end of the by-pass passage 28 and has a rod or stem 30 extending therethrough and into by-pass passage 28 in contact with a ball check valve 31 positioned therein. The lower end of rod 30 threadably engages the inner surface of the safety device while the outer end thereof is provided with a knurled knob 32. Valve 31 is normally maintained in a seated position to close off communication of passage 22 with passage 25 through the by-pass passage by turning knob 32 to thread rod 30 inwardly of device 29 until valve 31 is in a seated position. A cylinder 33 is formed in the outer end of device 29 and is provided with a piston 34 disposed for slidable movement therein. Piston 34 is loosely arranged on the portion of rod 30 extending through cylinder 33 and has a recess 35 in the outer portion thereof. Recess 35 is of sufficient size to permit knob 32 to fit therein, as hereinafter described. Piston 34 is normally maintained in its lowermost position in cylinder 33 by a compression spring 37 arranged on rod 30 in recess 35. A fluid supply line 39 is provided in device 29 in communication with the lower portion of cylinder 33. The opposite end of line 39 is connected to a pump 40 disposed on engine 10 and serving the oil lubrication system of said engine.

In operation, when it is desired to drive the compressor 11 by engine 10 through clutch 12 connected therebetween, the knurled knob 32 of safety device 29 is first turned or rotated to thread rod 30 inwardly of the device into contact with valve 31 to maintain the valve in a closed position, and cut off communication of passage 25 with passage 22 through the by-pass passage 28. Thereafter, the engine 10 is started in operation and drives the lubricating pump 40 connected thereto. When the pump 40 increases the pressure of the lubricating oil circulating in the engine above a predetermined value, for example, 30 p. s. i., a portion of the oil will flow through line 39 and into the lower portion of cylinder 33 and overcome the force in spring 37 maintaining the piston 34 in its lowermost position in the cylinder 33 of device 29 and piston 34 will move upwardly in the cylinder until knurled knob 32 is completely positioned within piston recess 35. Thereafter, pump handle 21 is manually operated to its uppermost position and moves plunger 19 upwardly in cylinder 18 and creates a vacuum therein. The pressure of the fluid in reservoir 17 then unseats ball check valve 26 in passage 25 and fluid flows through passage 25 into passage 22 and the lower portion of cylinder 18. Handle 21 is then moved downwardly in the cylinder and forces the fluid out of the lower portion of the cylinder and into passage 22. The pressure of the fluid seals or closes valve 26 in passage 25 and forces valve 23 in passage 22 open. The fluid thereafter passes through fluid line 14 to clutch actuator 15. Handle 21 is then pumped until sufficient pressure is built up in actuator 15 to move clutch linkage 15a and engage clutch 12 to drive the compressor 11 connected thereto.

With the safety device of the present invention, once the clutch 12 is engaged it cannot be released or disengaged until engine 10 is stopped and the engine oil pressure maintaining piston 34 in its uppermost position in cylinder 30 is decreased or reduced. This is because the knurled knob 32 is completely enclosed within recess 35 at this time and hence cannot be turned or rotated to thread rod 30 outwardly in safety device 29 to open valve 31. Opening of valve 31 permits the oil in line 14 to flow through by-pass passage 28 into reservoir 17 and decreases the pressure in actuator 15 below that necessary to operate the clutch mechanism 15a of the clutch.

When engine 10 is stopped, pump 40 ceases operation therewith and the oil pressure in line 39 decreases. The force in spring 37 then moves piston 34 downwardly to its lowermost position in cylinder 33. This exposes the knurled knob 32 beyond the end of piston recess 35 and the knob may be turned manually to thread the rod out of device 29 a short distance to permit valve 31 to unseat. Thereafter, a portion of the oil in line 14 flows through by-pass passage 28 into reservoir 17 thereby decreasing the oil pressure holding the clutch actuator 15 in contact with linkage 15a and the clutch 12 is disengaged or released.

It will be understood that changes may be made in the form, location and materials used in the construction of, and arrangement of the various parts of the apparatus disclosed herein without departing from the principles of the invention which is not to be limited excepting by the scope of the appended claims.

What is claimed is:

1. In a valve having a housing with a valve stem extending through the housing and threadably connected thereto, a handle on the end of said stem, a cylinder formed in the housing adjacent the handle, a piston slidably arranged on said stem in said cylinder, said piston having a recess disposed therein adapted to receive said handle, spring means on said stem between said piston and handle for maintaining said piston out of contact with said handle, and fluid supply means in communication with said cylinder to supply fluid under pressure thereto to move said piston in the cylinder so that said handle is within said piston recess.

2. In a valve having a housing with a valve stem extending through the housing and threadably connected to the lower portion thereof, a handle on the upper end of said stem, a cylinder formed in the housing adjacent the handle, a piston slidably arranged on said stem in said cylinder, said piston having a recess disposed therein adapted to receive said handle, spring means on said stem between said piston and handle for maintaining said piston out of contact with said handle, and fluid supply means in communication with the portion of said cylinder oppositely disposed from said handle to supply fluid under pressure thereto to move said piston in the cylinder so that said handle is within said piston recess.

3. In a clutch mechanism having fluid actuating means for engaging said mechanism, pump means for supplying fluid under pressure to the actuating means, an actuator supply line connected to said pump and actuating means, a discharge line in communication with the actuator supply line for passing fluid from the supply line therethrough, a valve disposed in said discharge line, valve actuating means for said valve comprising a housing, a rod extending through said housing and into contact with said valve, a piston arranged on said rod for relative movement therewith, said piston having a recess on the upper portion thereof, a handle connected to said rod and adapted to fit within said recess, a cylinder formed in said housing adjacent said handle, said piston disposed for slidable movement within said cylinder, spring means on said rod between said piston and handle adapted to maintain said piston out of contact with said handle, and fluid supply means in communication with said cylinder to supply fluid under pressure thereto to move said piston therein so that said handle is within said piston recess.

4. In a clutch mechanism having fluid actuating means for engaging said mechanism, pump means for supplying fluid under pressure to the actuating means, an actuator supply line connected to said pump and actuating means, a discharge line in communication with the supply line for passing fluid from the supply line therethrough, a valve disposed in said discharge line, valve actuating means for said valve comprising a housing, a rod extending through said housing and into contact with said valve, a piston arranged on said rod for relative movement therewith, said piston having a recess on the upper portion thereof, a handle connected to said rod and adapted to fit within said recess, a cylinder formed in the upper portion of said housing, said piston disposed for slidable movement within said cylinder, spring means on said rod between said piston and handle adapted to maintain said piston out of contact with said handle, and fluid supply means in communication with said cylinder opposite said handle end thereof to supply fluid under pressure thereto to move said piston therein so that said handle is within said piston recess.

5. In an apparatus wherein a compressor is driven by an internal combustion engine through clutch means connected therebetween, a fluid actuating means connected to said clutch means for engaging said clutch means, a hydraulic pump having a cylinder with a plunger therein, a pump handle pivotally connected to said plunger for reciprocating the plunger in said cylinder, a fluid reservoir in said pump, an inlet passage in communication with said reservoir and cylinder having a normally closed balance check valve therein for passing fluid to said cylinder, a discharge passage in communication with said cylinder having a normally closed balance check valve therein for passing fluid from said cylinder, an actuator supply line in communication with said discharge passage and said actuating means, a by-pass passage in communication with said inlet and discharge passages having a valve therein for passing fluid under pressure from said discharge passage to said inlet passage, a housing threadably connected to the lower portion of said hydraulic pump adjacent said by-pass passage, a rod in said housing threadably connected to the lower portion thereof, one end of said rod extending beyond the end of said housing into said by-pass passage in contact with the valve therein, the opposite end of said rod extending beyond the opposite end of said housing, a release handle disposed on said opposite end of the rod, said housing forming a cylinder in the portion thereof adjacent said release handle, a piston disposed for slidable movement in said cylinder having a recess in the portion thereof adjacent said release handle, said piston being loosely mounted on said rod, a compression spring arranged on said rod in said piston recess to maintain said piston out of contact with said release handle, a lubricating pump connected to said engine, a lubricating pump discharge line in communication with said lubricating pump and said cylinder to supply oil under pressure to said piston to move said piston in the cylinder so that said release handle is within said piston recess.

6. In an apparatus wherein a compressor is driven by an internal combustion engine through clutch means connected therebetween, a fluid actuating means connected to said clutch means for engaging said clutch means, a hydraulic pump having a cylinder with a plunger therein, a pump handle pivotally connected to said plunger for reciprocating the plunger in said cylinder, a fluid reservoir in said pump, an L-shaped inlet passage in communication with said reservoir and cylinder having a normally closed balance check valve therein for passing fluid to said cylinder, a vertical discharge passage in communication with said cylinder having a normally closed balance check valve therein for passing fluid from said cylinder, an actuator supply line in communication with said discharge passage and said actuating means, a by-pass passage in communication with said inlet and discharge passages having a valve therein for passing fluid under pressure from said discharge passage to said inlet passage, an inclined housing threadably connected to the lower portion of said hydraulic pump adjacent said by-pass passage, a rod in said housing threadably connected to the lower portion thereof, one end of said rod extending beyond the lower end of said housing into said by-pass passage in contact with the valve therein, the opposite end of said rod extending beyond the upper end of said housing, a release handle disposed on said upper end of the rod, said housing forming a cylinder in the upper portion thereof, a piston disposed for slidable movement in said cylinder having a recess in the upper portion thereof adjacent said release handle, said piston being loosely mounted on said rod, a compression spring arranged on said rod in said piston recess to maintain said piston in its lowermost position in the cylinder out of contact with said release handle, a lubricating pump connected to said engine, a lubricating pump discharge line in communication with said lubricating pump and said cylinder to supply oil under pressure to said piston to move said piston to its uppermost position in the cylinder so that said release handle is within said piston recess.

7. In a valve having a housing with a valve stem extending through the housing and threadably connected thereto, a handle on the end of said stem, a cylinder formed in the housing, a piston slidably arranged on said stem in said cylinder, said piston having a recess disposed therein adapted to receive said handle, tension means for maintaining said piston out of contact with said handle, and fluid supply means in communication with said cylinder to supply fluid under pressure thereto, to move said piston in the cylinder so that said handle is within said piston recess.

8. In a clutch mechanism having fluid actuating means for engaging said mechanism, pump means for supplying fluid under pressure to the actuating means, an actuator supply line connected to said pump and actuating means, a discharge line in communication with the actuator supply line for passing fluid from the supply line therethrough, a valve disposed in said discharge line, valve actuating means for said valve comprising a housing, a rod extending through said housing and into contact with said valve, a piston arranged on said rod for relative movement therewith, said piston having a recess on one end thereof, a handle connected to said rod and adapted to fit within said recess, a cylinder formed in said housing, said piston disposed for slidable movement within said cylinder, tension means to maintain said piston out of contact with said handle, and fluid supply means in communication with said cylinder to supply fluid under pressure thereto to move said piston therein so that said handle is within said piston recess.

References Cited in the file of this patent
UNITED STATES PATENTS

| | | |
|---|---|---|
| 536,053 | Waldron | Mar. 19, 1895 |
| 2,234,795 | Brown | Mar. 11, 1941 |
| 2,711,808 | Richardson | June 28, 1955 |